United States Patent
Xiong

(10) Patent No.: US 10,320,303 B1
(45) Date of Patent: Jun. 11, 2019

(54) FREQUENCY CONTROLLED DUMMY LOAD TO STABILIZE PFC OPERATION AT LIGHT LOAD CONDITIONS

(71) Applicant: Universal Lighting Technologies, Inc., Madison, AL (US)

(72) Inventor: Wei Xiong, Madison, AL (US)

(73) Assignee: Universal Lighting Technologies, Inc, Madison, AL (US)

( * ) Notice: Subject to any disclaimer, the term of this patent is extended or adjusted under 35 U.S.C. 154(b) by 0 days.

(21) Appl. No.: 16/120,930

(22) Filed: Sep. 4, 2018

Related U.S. Application Data

(60) Provisional application No. 62/553,198, filed on Sep. 1, 2017.

(51) Int. Cl.
*H02M 3/335* (2006.01)
*H02M 1/42* (2007.01)

(52) U.S. Cl.
CPC ..... *H02M 3/33569* (2013.01); *H02M 1/4225* (2013.01)

(58) Field of Classification Search
CPC ......... H02M 3/33507; H02M 3/33515; H02M 3/33523; H02M 3/33569; H02M 3/33576; H02M 3/33592; H02M 1/08; H02M 1/15; H02M 1/32; H02M 1/42; H02M 1/4225; H02M 1/4258; Y02B 70/126; Y02B 70/1433
USPC ............................... 363/16, 17, 21.01–21.18
See application file for complete search history.

(56) References Cited

U.S. PATENT DOCUMENTS

| | | | |
|---|---|---|---|
| 6,018,467 A * | 1/2000 | Majid | H02M 3/33523 363/16 |
| 7,233,258 B1 | 6/2007 | Gelinas | |
| 8,344,638 B2 * | 1/2013 | Shteynberg | H05B 33/0815 315/185 S |
| 8,698,849 B2 | 4/2014 | Woo et al. | |
| 9,780,638 B2 * | 10/2017 | Simi | H05B 33/0887 |
| 9,787,195 B1 * | 10/2017 | Xiong | H02M 3/33507 |
| 9,917,524 B2 | 3/2018 | Fang et al. | |
| 10,128,740 B1 | 11/2018 | Xiong | |
| 2004/0003301 A1 | 1/2004 | Nguyen | |
| 2011/0242856 A1 | 10/2011 | Halberstadt | |
| 2012/0099344 A1 * | 4/2012 | Adragna | H02M 3/3372 363/21.03 |

(Continued)

*Primary Examiner* — Yemane Mehari
(74) *Attorney, Agent, or Firm* — Patterson Intellectual Property Law, P.C.; Gary L. Montle; Jerry Turner Sewell

(57) ABSTRACT

A system and a method offset the effect of a reduced load current on a power factor controller connected to a DC-to-DC converter having a switching DC-to-AC inverter driving an output rectifier that produces the load current. A frequency-dependent load impedance is coupled to the output of the inverter. The frequency-dependent load impedance is configured to have a first impedance when the inverter is operating at the minimum operating frequency. The frequency-dependent load impedance has a second impedance when the inverter is operating at the maximum operating frequency. The second impedance is lower than the first impedance and produces a dummy load current that is added to the actual load current to provide a sufficient total load current to cause the power factor controller to operate in a continuous mode even when the actual load current is insufficient to cause the power factor controller to operate in a continuous mode.

13 Claims, 7 Drawing Sheets

(56) References Cited

U.S. PATENT DOCUMENTS

| | | | |
|---|---|---|---|
| 2012/0250360 A1* | 10/2012 | Orr | H02M 3/3376 363/21.02 |
| 2013/0107585 A1* | 5/2013 | Sims | H02M 3/33592 363/21.14 |
| 2014/0232270 A1* | 8/2014 | Kimura | H05B 33/0815 315/122 |
| 2015/0102742 A1 | 4/2015 | Deng et al. | |
| 2015/0124489 A1* | 5/2015 | Dai | H02M 3/335 363/17 |

* cited by examiner

US 10,320,303 B1

FREQUENCY CONTROLLED DUMMY LOAD TO STABILIZE PFC OPERATION AT LIGHT LOAD CONDITIONS

CROSS-REFERENCE TO RELATED APPLICATION

This application claims the benefit under 35 U.S.C. § 119(e) of U.S. Provisional Application No. 62/553,198, filed Sep. 1, 2017, entitled "Frequency Controlled Dummy Load to Stabilize PFC Operation at Light Load Conditions," which is hereby incorporated by reference in its entirety.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supplies that provide a DC current to a load, such as, for example, light-emitting diodes. More particularly, the present disclosure relates to an apparatus and a method for sensing current through the load to provide feedback to the power supply to enable the power supply to maintain a substantially constant current through the load.

BACKGROUND

Half-bridge resonant type DC-DC converters are used to implement constant current power supplies for use in light-emitting diode (LED) drivers and the like. In certain driver circuits, the half-bridge resonant type DC-DC converter is implemented as a second stage of a two-stage power system. The first stage of the two-stage power system is implemented as a rectifier that receives power from an AC source and by a power factor controller (PFC). The PFC receives the rectified output of the rectifier and provides a conditioned voltage to the input of the first stage. The PFC operates to reduce AC input current distortion. The PFC operates over a large load range; however, under very low conditions, the PFC may draw input current only during a portion of each AC cycle. When the input current turns off, noise may be generated, which may cause the second stage to introduce pulses in the load current on the output of the second stage. The pulses in the load current may introduce unwanted flickering in the light provided by the LEDs coupled to the output of the second stage.

BRIEF SUMMARY

Flickering of the light produced by the LED load is not acceptable. Accordingly, a need exists to eliminate the rapid changes in the current drawn by the power factor controller under low output load current conditions.

One aspect of the embodiments disclosed herein is a system and a method to offset the effect of a reduced load current on a power factor controller connected to a DC-to-DC converter having a switching DC-to-AC inverter driving an output rectifier that produces the load current. A frequency-dependent load impedance is coupled to the output of the inverter. The frequency-dependent load impedance is configured to have a first impedance when the inverter is operating at the minimum operating frequency. The frequency-dependent load impedance has a second impedance when the inverter is operating at the maximum operating frequency. The second impedance is lower than the first impedance and produces a dummy load current that is added to the actual load current to provide a total load current. The total load current is sufficient to cause the power factor controller to operate in a continuous mode even when the actual load current is insufficient to cause the power factor controller to operate in a continuous mode.

Another aspect of the embodiments disclosed herein is a system for controlling the current through a DC load. The system comprises a first rectifier circuit configured to receive an AC voltage. The rectifier generates a rectified voltage on rectifier output. A power factor controller is coupled to the rectifier output. The power factor controller generates a conditioned DC voltage on a power factor controller output. A DC-to-DC converter is coupled to the power factor controller output to receive the conditioned DC voltage and to generate a load current. The DC-to-DC converter includes a DC-to-AC inverter configured to generate a switched AC voltage at an operating frequency. The operating frequency has a frequency range between a minimum frequency and a maximum frequency. The DC-to-AC inverter is configured to vary the operating frequency in response to a feedback signal. An isolation transformer has a primary winding coupled to the output of the DC-to-AC inverter to receive the switched AC voltage. The transformer produces a secondary AC voltage on the secondary winding. A second rectifier circuit is connected to the secondary winding of the isolation transformer to receive the secondary AC voltage. The second rectifier circuit is configured to rectify the secondary AC voltage to provide a DC voltage to a load to cause a load current to flow through the load. A current sensor generates a feedback signal responsive to the magnitude of the load current and the magnitude of a reference current. The DC-to-AC inverter is responsive to the feedback signal to increase the operating frequency when the magnitude of the load current is greater than the magnitude of the reference current and to decrease the operating frequency when the magnitude of the load current is less than the magnitude of the reference current. A frequency-dependent load impedance is coupled to the output of the DC-to-AC inverter. The frequency-dependent load impedance is configured to have a first impedance when the DC-to-AC inverter is operating at the minimum operating frequency. The frequency-dependent load impedance has a second impedance when the DC-to-AC inverter is operating at the maximum operating frequency.

In certain embodiments in accordance with this aspect, the first impedance is greater than the second impedance such that the frequency-dependent load impedance draws more current from the DC-to-AC inverter at the maximum operating frequency and draws less current from the DC-to-AC inverter at the minimum operating frequency.

In certain embodiments in accordance with this aspect, the frequency-dependent load impedance comprises a series resistance-capacitance circuit connected between the output of the DC-to-AC inverter and a reference voltage. The series resistance-capacitance circuit has a variable impedance that varies from the first impedance at the minimum operating frequency to the second impedance at the maximum operating frequency.

In certain embodiments in accordance with this aspect, the frequency-dependent load impedance comprises a load resistor in series with a semiconductor switch. The load resistor and the semiconductor switch are connected between the output of the DC-to-AC inverter and a reference voltage. The semiconductor switch has a control terminal. A switch controller is connected to the control terminal of the semiconductor switch. The switch controller is responsive to the operating frequency of the switched AC voltage to turn off the semiconductor switch when the operating frequency is below a threshold frequency and to turn on the semiconductor switch when the operating frequency is at or above the threshold frequency. The load resistor draws current from the DC-to-AC inverter only when the semiconductor switch is turned on.

Another aspect of the embodiments disclosed herein is a method for maintaining a power factor controller in a continuous operation mode in an LED driver circuit. The power factor controller receives a rectified voltage from a first rectifier and generates a conditioned DC voltage to a DC-to-DC converter. The DC-to-DC converter includes a DC-to-AC inverter operating at a variable switching frequency to provide an AC voltage on an inverter output. The inverter output is AC-coupled to a second rectifier. The second rectifier generates a load current. The variable switching frequency varies from a minimum switching frequency at a maximum load current to a maximum switching frequency at a minimum load current. The power factor controller operates in a discontinuous operation mode at the minimum load current. The method comprises coupling a frequency-dependent load impedance to the inverter output. The method further comprises varying the frequency-dependent load impedance from a first load impedance at the minimum switching frequency of the inverter to a second load impedance at the maximum switching frequency. The first load impedance is greater than the second load impedance. The second load impedance is sufficiently small to cause an additional current to flow from the inverter output. The additional current is sufficient to cause the power factor controller to operate in the continuous operation mode when the DC-to-AC inverter is operating at the maximum switching frequency.

In certain embodiments in accordance with this aspect, the frequency-dependent load impedance varies continuously from the first load impedance to the second load impedance as the switching frequency varies from the minimum switching frequency to the maximum switching frequency.

In certain embodiments in accordance with this aspect, the first load impedance is maintained over a first range of switching frequencies from the minimum switching frequency to a frequency less than a threshold switching frequency; and the second load impedance is maintained over a second range of switching frequencies from the threshold switching frequency to the maximum switching frequency.

In certain embodiments in accordance with this aspect, the first load impedance is effectively an open circuit; and the second load impedance is effectively the impedance of a resistor selectively connected to the inverter output by turning on a semiconductor switch.

Another aspect of the embodiments disclosed herein is a system for controlling the current through a DC load. The system comprises a power factor controller that provides a DC voltage to a first voltage rail, which is referenced to a second voltage rail. A DC-to-AC inverter is coupled between the first voltage rail and the second voltage rail. The DC-to-AC inverter has an inverter output. The DC-to-AC inverter switches the inverter output between the first voltage rail and the second voltage rail at a variable operating frequency. An isolation transformer has a primary winding AC-coupled to the inverter output and has a secondary winding connected to an AC-to-DC rectifier. The AC-to-DC rectifier provides a secondary current to a DC load. The DC load current is responsive to the operating frequency of the DC-to-AC inverter. A frequency-dependent load impedance is coupled to the inverter output. The frequency-dependent load impedance is configured to have a first impedance when the variable operating frequency is at a minimum operating frequency, and to have a second impedance when operating frequency is at a maximum operating frequency.

In certain embodiments in accordance with this aspect, the frequency-dependent load impedance comprises a series resistance-capacitance circuit connected between the output of the DC-to-AC inverter and a reference voltage. The series resistance-capacitance circuit has a variable impedance that varies from the first impedance at the minimum operating frequency to the second impedance at the maximum operating frequency.

In certain embodiments in accordance with this aspect, the first impedance is greater than the second impedance such that the frequency-dependent load impedance draws more current from the DC-to-AC inverter at the maximum operating frequency and draws less current from the DC-to-AC inverter at the minimum operating frequency.

In certain embodiments in accordance with this aspect, the frequency-dependent load impedance comprises a load resistor in series with a semiconductor switch. The load resistor and the semiconductor switch are connected between the output of the DC-to-AC inverter and a reference voltage. The semiconductor switch has a control terminal. A switch controller is connected to the control terminal of the semiconductor switch. The switch controller is responsive to the operating frequency of the switched AC voltage to turn off the semiconductor switch when the operating frequency is below a threshold frequency and to turn on the semiconductor switch when the operating frequency is at or above the threshold frequency. The load resistor draws current from the DC-to-AC inverter only when the semiconductor switch is turned on.

BRIEF DESCRIPTIONS OF THE SEVERAL VIEWS OF THE DRAWINGS

DETAILED DESCRIPTION

Reference will now be made in detail to embodiments of the present disclosure, one or more drawings of which are set forth herein. Each drawing is provided by way of explanation of the present disclosure and is not a limitation. It will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

It is intended that the present disclosure covers such modifications and variations as come within the scope of the appended claims and their equivalents. Other objects, features, and aspects of the present disclosure are disclosed in the following detailed description. It is to be understood by one of ordinary skill in the art that the present discussion is a description of exemplary embodiments only and is not intended as limiting the broader aspects of the present disclosure.

Figure 1:
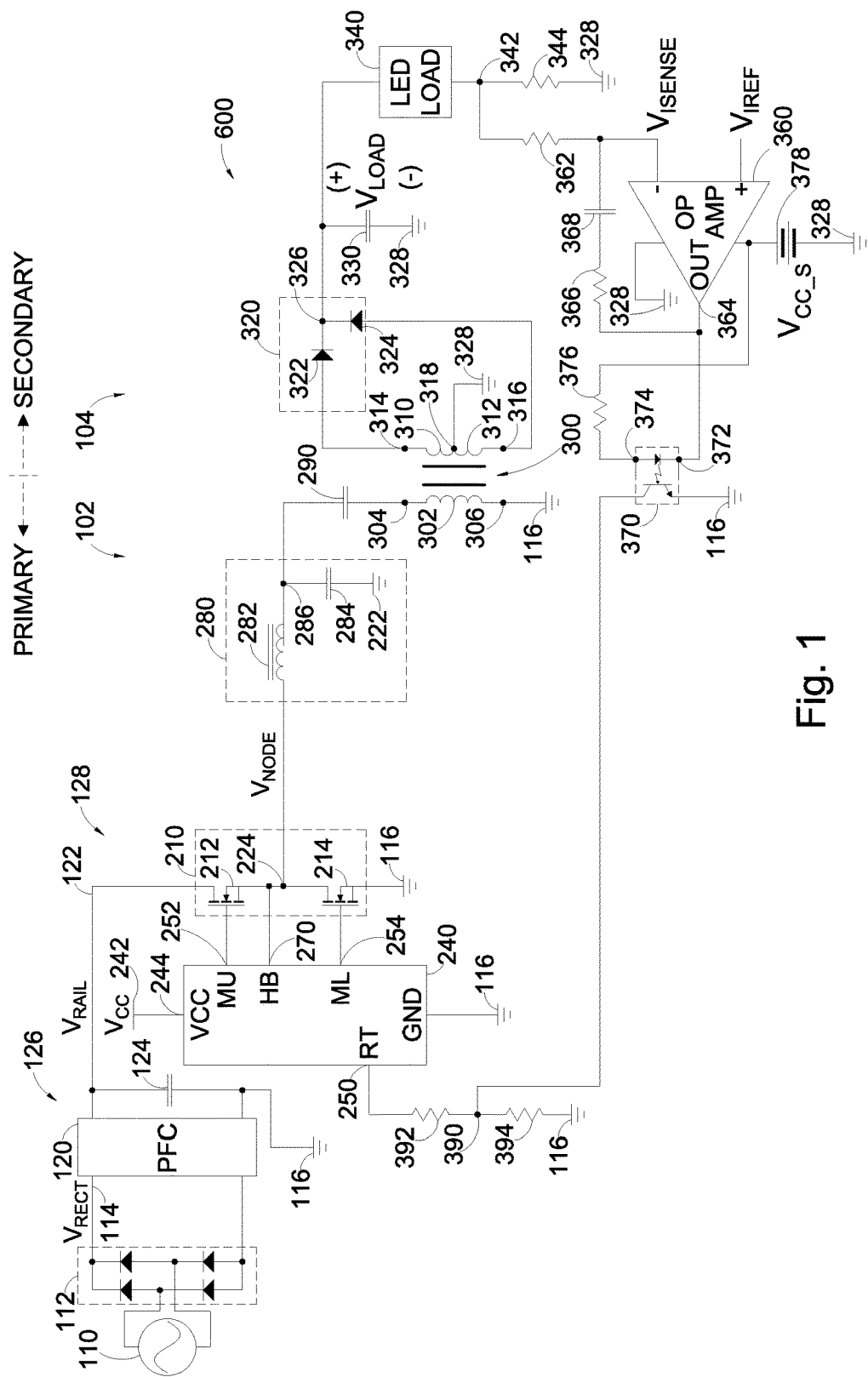
FIG. 1 illustrates an LED driver that includes a first stage coupled to an AC source, the first stage comprising a rectifier and a power factor controller (PFC), the LED driver further including a second stage that comprises a half-bridge resonant type DC-DC converter responsive to the voltage output from the first stage to generate a controllable load current.

FIG. 1 illustrates a half-bridge resonant type LED driver 100, which provides a two-stage solution for providing a constant current output power supply. The illustrated LED driver offers a wide range of output load currents and is stable over the operating range. The LED driver includes a primary circuit side 102 and a secondary circuit side 104, which are electrically isolated as described below.

The LED driver 100 receives power from an AC source 110, such as, for example, electrical mains within an office, a residence or other structure to be lighted. The AC input from the AC source is rectified by a full-wave bridge rectifier 112, which produces an unfiltered DC voltage $V_{RECT}$ on a first (unconditioned) voltage bus 114. The voltage on the first voltage bus is referenced to a primary side circuit ground reference 116. The primary side circuit ground reference may also be considered to be a reference voltage rail. The DC voltage from the bridge rectifier is provided as the voltage input to a power factor controller (PFC) 120. The PFC operates in a conventional manner to force the line current from the AC source to follow the line voltage such that the line current is substantially in phase with the line voltage (e.g., to achieve a power factor close to 1.0). The PFC also operates to reduce the total harmonic distortion (THD) of the voltage provided by the AC source. The output from the PFC is provided as a DC voltage $V_{RAIL}$ on a second (conditioned) voltage bus 122. A filter capacitor 124 is connected from the second voltage bus to the primary side circuit ground reference. The bridge rectifier and the PFC comprise a first stage 126 of the LED driver, which converts the AC input voltage from the AC source to the DC voltage $V_{RAIL}$ on the second voltage bus. The DC voltage $V_{RAIL}$ is provided as the source voltage for a second stage 128 of the LED driver, which is described below. The second voltage bus may also be considered to be a first voltage rail; and the primary side circuit ground reference may also be considered to be a second voltage rail.

Figure 2:
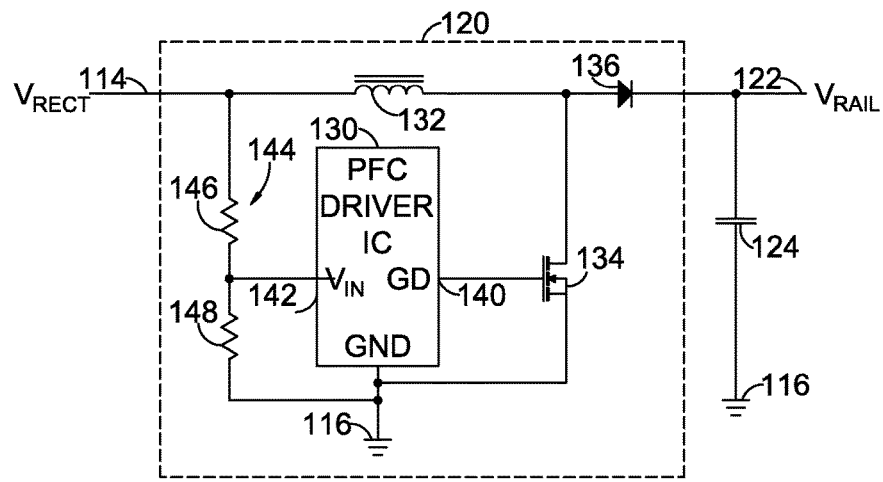
FIG. 2 illustrates an example of the power factor controller of FIG. 1.

An example of the PFC 120 is illustrated in FIG. 2. The PFC includes a PFC gate driver integrated circuit (IC) 130, a boost inductor 132, a metal oxide semiconductor field effect transistor (MOSFET) 134 and a boost diode 136. The boost inductor has one terminal connected to the first voltage bus 114 to receive the unfiltered $V_{RECT}$ voltage and has a second terminal connected to the drain of the MOSFET. The second terminal of the boost inductor is also connected to the anode of the boost diode. The cathode of the boost diode is connected to the second voltage bus 122 to provide the $V_{RAIL}$ voltage. As shown in FIG. 1 and as reproduced in FIG. 2, the filter capacitor 124 is connected between the second voltage ($V_{RAIL}$) bus and the primary side circuit ground reference 116. The source of the MOSFET is also connected to the primary side circuit ground reference. The gate terminal of the MOSFET is connected to a gate driver (GD) output terminal 140 of the gate driver IC.

The gate driver IC 130 receives an input voltage on a $V_{IN}$ terminal 142 from a voltage divider circuit 144 connected between the first voltage bus 114 and the primary side circuit ground reference 116. The voltage divider circuit comprises a first voltage divider resistor 146 and a second voltage divider resistor 148. The voltage across the second voltage divider resistor is proportional to the unfiltered $V_{RECT}$ voltage on the first voltage bus. The gate driver IC also receives feedback signals that are responsive to the current through the MOSFET and responsive to the conditioned voltage on the second voltage bus 122. The details of the feedback signals are well known and are not illustrated in FIG. 2.

In the illustrated embodiment, the gate driver IC is an L6562 or an L6562A transition-mode PFC controller, both of which are commercially available from STMicroelectronics of Geneva, Switzerland. The gate driver IC receives the signal responsive to the unconditioned $V_{RAIL}$ voltage on the $V_{IN}$ input terminal 142. The gate drive IC generates the gate drive signal on the GD output terminal 140, which drives the gate terminal of the MOSFET 134. The MOSFET is responsive to the gate driver signal to selectively connect the second terminal of the boost inductor 132 to the primary side circuit ground reference 116 to charge the boost inductor from the first voltage bus 114 and to disconnect the second terminal of the boost inductor to cause the boost inductor to discharge to the second voltage bus 122 via the boost diode 134. The gate driver IC is responsive to the input voltage on the $V_{IN}$ terminal 142 and the feedback signals (not shown) to control the switching of the MOSFET to control the voltage on the second voltage bus such that the current from the AC voltage source 110 is substantially in phase with the voltage provided by the AC voltage source and such that the total harmonic distortion (THD) of the source voltage is reduced. The operations of a PFC to control the power factor and to control THD are well known and are not further described herein.

The second stage 128 of the LED driver 100 is a DC-to-DC converter that receives the voltage $V_{RAIL}$ on the output of the PFC 120 and that generates a DC voltage having a controllable current magnitude as described below. The DC-to-DC converter (second stage) includes a first switch 212 and a second switch 214 in a half-bridge switching circuit 210. The switches may be, for example, MOSFETs or bipolar junction transistors (BJTs). In the illustrated embodiment, the two switches are n-channel MOSFETs. The half-bridge switching circuit is connected between the second voltage bus ($V_{RAIL}$) 122 and the primary circuit ground reference 116. The drain of the first switch is connected to the second voltage bus. The source of the first switch is connected to the drain of the second switch at a common switched node 224 of the half-bridge switching circuit. The source of the second switch is connected to the primary circuit ground reference.

Each of the first switch 212 and the second switch 214 has a respective control input terminal. In the illustrated embodiment incorporating MOSFETs, the control input terminals are the gates of the two transistors. The control input terminals are driven by a self-oscillating half-bridge gate drive integrated circuit (drive IC) 240, such as, for example, an NCP1392B high-voltage half-bridge driver with inbuilt oscillator, which is commercially available from ON Semiconductor Company of Phoenix, Ariz. The drive IC is powered by a DC voltage ($V_{CC}$) source 242 via a $V_{CC}$ input pin 244. The DC voltage source may be derived from the unfiltered rectified voltage $V_{RECT}$.

The drive IC 240 is responsive to a timing resistance connected to a timing input terminal (RT) 250 to alternately apply an upper drive voltage on an upper drive terminal (MU) 252 and apply a lower drive voltage to a lower drive terminal (ML) 254. The upper output drive voltage is applied to the control input terminal of the first switch 212. The lower output drive voltage is applied to the control input terminal of the second switch 214. A switched signal $V_{NODE}$ is produced on the common switch node 224 by the alternate connection of the common switched node to $V_{RAIL}$ when the first switch is turned on and to the ground reference when the second switch is turned on. The switching frequency of the switched signal is determined by the resistance applied to the timing input terminal, which controls the magnitude of the current flowing out of the timing input terminal. When the resistance applied to the timing input terminal increases, the current flowing out of the timing input terminal decreases, which causes the frequency of the drive voltages applied to the two switches to decrease. When the resistance applied to the timing input terminal decreases, the current flowing out of the timing input terminal increases, which causes the frequency of the drive voltages to increase. The drive IC may include other inputs, which are not shown in FIG. 1.

The common switched node 224 of the half-bridge switching circuit 210 is connected to a half-bridge connection terminal (HB) 270 of the drive IC 240. The common switched node is also connected to a first terminal of a resonant inductor 282 in a resonant circuit 280. A second terminal of the resonant inductor is connected to a first terminal of a resonant capacitor 284 at an output node 286 in the resonant circuit. A second terminal of the resonant capacitor is connected to the primary circuit ground reference 116. The resonant inductor and the resonant capacitor are the main resonant components of the resonant circuit, which is driven by the alternatingly connecting the common switched node to the second bus 122 via the first switch 212 and to the primary circuit ground reference via the second switch 214.

The output node 286 of the resonant circuit 280 is connected to a first terminal of a DC-blocking capacitor 290. A second terminal of the DC blocking capacitor is connected to a first terminal 304 of a primary winding 302 of an output isolation transformer 300. A second terminal 306 of the primary winding of the output isolation transformer is connected to the primary circuit ground reference 116. The foregoing components operate as a DC-to-AC inverter to produce an AC voltage across the primary winding of the output isolation transformer.

The output isolation transformer 300 includes a first secondary winding 310 and a second secondary winding 312. The two secondary windings are electrically isolated from the primary winding 302. As illustrated, the primary winding is on the primary circuit side 102, and the secondary windings are on the secondary circuit side 104. The two secondary windings have respective first terminals, which are connected at a center tap 318. Respective second terminals 314, 316 of the first and second secondary windings are connected to input terminals of a half-bridge rectifier 320. The half-bridge rectifier comprises a first rectifier diode 322 and a second rectifier diode 324. The second terminal of the first secondary winding is connected to the anode of the first rectifier diode. The second terminal of the second secondary winding is connected to the anode of the second rectifier diode. The cathodes of the two rectifier diodes are connected together at an output node 326 of the half-bridge rectifier. The center tap of the first and second secondary windings is connected to a secondary circuit ground reference 328. In other embodiments having a single, non-center-tapped secondary winding, the half-bridge rectifier with the two rectifier diodes may be replaced with a full-bridge rectifier with four rectifier diodes.

The output node 326 of the half-bridge rectifier 320 is connected to a first terminal of an output filter capacitor 330. A second terminal of the output filter capacitor is connected to the secondary circuit ground reference 328. A load voltage ($V_{LOAD}$) is developed across the output filter capacitor at the output node of the half-bridge rectifier. The output node of the half-bridge rectifier is also connected to a first terminal of a load 340, which may comprise, for example, one or more light-emitting didoes (LEDs) that emit light when sufficient current passes through the LEDs. A second terminal of the load is connected to a current sensing terminal 342 and to the first terminal of a current sensing resistor 344. A second terminal of the current sensing resistor is connected to the secondary circuit ground reference. When current flows through the load, the same current flows through the current sensing resistor. Accordingly, a voltage develops on the current sensing terminal that has a magnitude with respect to the secondary circuit ground reference that is proportional to the current flowing through the load. In one embodiment, the current sensing resistor has a resistance of, for example, 0.1 ohm such that the effect of the resistance of the current sensing resistor on the load current is insignificant.

When the drive IC 240 operates to apply alternating drive voltages to the first switch 212 and the second switch 214, an AC voltage develops across the resonant capacitor 284. The voltage across the resonant capacitor may include a DC component; however, the DC blocking capacitor 290 transfers only the AC component of the energy stored in the resonant capacitor to the primary winding 302 of the output isolation transformer 300. The transferred energy is magnetically coupled from the primary winding to the electrically isolated first and second secondary windings 310, 312. The first and second rectifier diodes 322, 324 in the half-bridge rectifier 320 rectify the AC energy from the secondary windings into DC energy, which is provided on the output node 326. The DC energy is stored in the output filter capacitor 330 at a voltage determined by the amount of stored energy. Current from the output filter capacitor is provided to the load 340 at a magnitude determined by the voltage on the half-bridge rectifier output node and the resistance of the load.

Because the intensity of the light emitted by the LEDs in the load 340 is dependent on the magnitude of the current flowing through the LEDs, the current is controlled closely. The current sensing resistor 344 senses the current going through the load and develops a voltage $V_{ISENSE}$ on the current sensing node 342 proportional to the load current. The voltage representing the sensed current is fed back to a proportional integral (PI) current control loop to provide current regulation. In FIG. 1, the PI current control loop comprises an operational amplifier (OPAMP) 360 having an inverting (−) input terminal, having a non-inverting (+) input terminal, and having an output (OUT) on an output terminal 364. The current sensing node is connected to the inverting input of the operational amplifier via a series resistor 362. A feedback resistor 366 and a feedback capacitor 368 are connected in series between the output terminal of the operational amplifier and the inverting input. A reference voltage ($V_{IREF}$) having a magnitude corresponding to a reference current ($I_{REF}$) is connected to the non-inverting input of the operational amplifier. The magnitude of the reference current and thus the magnitude of the reference voltage are selected to produce a desired load current through the load. The reference current may be a fixed reference current to provide a constant load current, or the reference current may be a variable reference current to allow the load current to be varied to thereby change the intensity of the light emitted by the LEDs in the load. For example, the reference voltage may be generated by a dimmer circuit (not shown) that selectively produces a plurality of voltage levels corresponding to a plurality of load currents, wherein each magnitude of load current corresponds to a light intensity. The operational amplifier is responsive to the relative magnitudes of the reference voltage $V_{IREF}$ and the sensed voltage $V_{ISENSE}$ to provide feedback to the drive IC 140 as described below.

The output 364 of the operational amplifier 360 is connected to a first input 372 of a photocoupler 370. The photocoupler (also referred to as an opto-isolator or an optocoupler) has an internal light generation section (e.g., an LED) coupled to the input of the photocoupler. In the illustrated embodiment, the output voltage from the operational amplifier is applied to the cathode of the internal LED via the first input. The anode of the internal LED is connected via a second input 374 of the photocoupler to a first terminal of a pullup resistor 376. A second terminal of the pullup resistor is connected to a secondary positive voltage ($V_{CC\_S}$) source 378, which is referenced to the secondary ground reference 328. The voltage source also provides the supply voltage to the operational amplifier. The internal LED in the light generation section is responsive to a low voltage applied to the first input to generate light. The intensity of the generated light is responsive to the magnitude of the difference between the voltage on the first input and the secondary positive voltage $V_{CC\_S}$. The generated light is propagated internally to the base of a phototransistor in an output section within the same component. The phototransistor is responsive to the generated light to vary the conductivity and thereby to effectively vary the impedance of the phototransistor. The phototransistor has a collector that is connected to a timing current control node 390. The phototransistor has an emitter that is connected to the primary circuit ground reference 116. A first timing resistor 292 is connected from the timing input terminal (RT) 150 of the drive IC 140 to the timing current control node. A second timing resistor 294 is connected from the timing current control node to the primary circuit ground reference. As illustrated the photocoupler electrically isolates the secondary circuit voltages and the secondary circuit ground reference in the secondary circuit side 104 from the components in the primary circuit side 102.

When the voltage applied to the first input 372 of the photocoupler 370 from the output 364 of the operational amplifier 360 decreases (e.g., becomes more negative with respect to the secondary positive voltage ($V_{CC\_S}$) connected to the pullup resistor 376), the conduction of the phototransistor in the output section of the photocoupler increases to effectively reduce the resistance from the timing current control node 390 to the primary circuit ground reference 116 such that the current from the timing input (RT) terminal 250 to the primary circuit ground reference increases. The increased current increases the switching frequency of the drive IC 240.

When the voltage applied to the first input 372 of the photocoupler 370 increases (e.g., becomes less negative with respect to the secondary positive voltage ($V_{CC\_S}$) connected to the pullup resistor 376), the conduction of the phototransistor in the output section of the photocoupler decreases to effectively increase the resistance from the timing current control node 390 to the primary circuit ground reference 116 such that the current from the timing input (RT) terminal 250 to the primary circuit ground reference decreases. The decreased current decreases the switching frequency of the drive IC 240.

The illustrated drive IC 240 has a fixed deadtime between turning off one of the switched outputs and turning on the other of the switched outputs. The fixed deadtime causes the duty cycle of the on-time of each of the first and second switches 212, 214 to decrease with increased frequency and to increase with decreased frequency. A decrease in duty cycle causes the energy transferred to the load to decrease. An increase in duty cycle causes the energy transferred to the load to increase. Thus, the load current decreases with increased switching frequency, and the load current increases with decreased switching frequency.

From the foregoing, it can be seen that when the load current through the current sensing resistor 344 generates a voltage $V_{ISENSE}$ that is less than the voltage $V_{IREF}$ corresponding to the reference current $I_{REF}$, the output voltage of the operational amplifier 360 increases. The increased output voltage produced by the operational amplifier causes the photocoupler 370 to decrease the light generated between the input section and the output section, which causes the photoresistor in the output section to decrease conductivity and thus increase the effective impedance on the input to the timing input (RT) terminal 250. The increased effective impedance decreases the current flowing out of the timing input terminal. The decreased current decreases the switching frequency of the drive IC 140, which increases the duty cycle of each switching voltage applied to the respective control input terminals of the first switch 212 and the second switch 214. The increased duty cycle has the effect of increasing the energy transferred to the output filter capacitor 230, which increases the voltage on the output node 226, which increases the current flowing through the load 340. The load current will increase until the sensed load current is substantially equal to the reference current.

When the current flowing through the load 340 is greater than the reference current, the opposite transitions occur. The voltage on the output of the operational amplifier 360 decreases. The decreased output voltage produced by the operational amplifier causes the photocoupler 370 to increase the light generated between the input section and the output section, which causes the photoresistor in the output section to increase conductivity and thus decrease the effective impedance on the input to the timing input (RT) terminal 250. The decreased effective impedance increases the current flowing out of the timing input terminal. The increased current increases the switching frequency of the drive IC 140, which decreases the duty cycle of each switching voltage applied to the respective control input terminals of the first switch 212 and the second switch 214. The decreased duty cycle has the effect of decreasing the energy transferred to the output filter capacitor 230, which decreases the voltage on the output node 226, which decreases the current flowing through the load. The load current will decrease until the sensed load current is substantially equal to the reference current.

As discussed above, the PFC 120 operates in a conventional manner to force the line current from the AC source 110 to follow the line voltage such that the line current is substantially in phase with the line voltage (e.g., to achieve a power factor close to 1.0). The PFC also operates to reduce the total harmonic distortion (THD) of the voltage provided by the AC source.

Figure 3A:
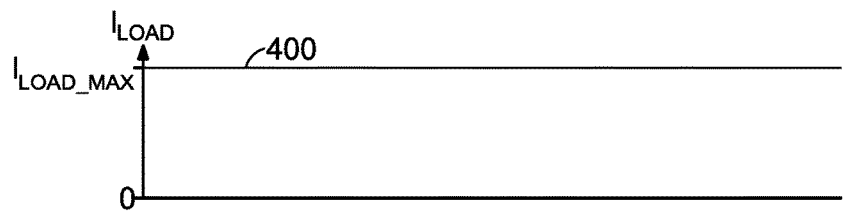
FIG. 3A illustrates a graph of an output load current $I_{LOAD}$ produced by the DC-DC converter of FIG. 1.
Figure 3B:
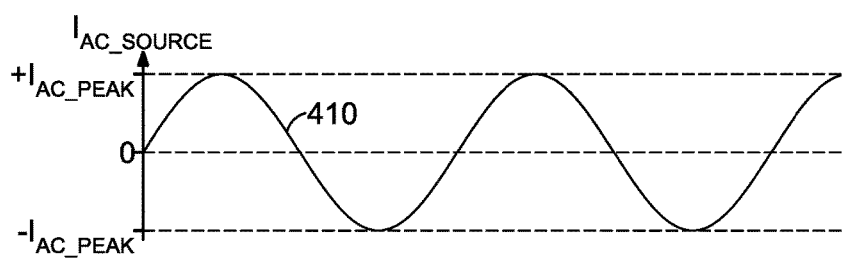
FIG. 3B illustrates a graph of the current drawn by the power factor controller of FIGS. 1 and 2 from the AC source at the high load current of FIG. 3A.

When the light intensity provided by the LED loud 340 is high, the output current provided to the load is sufficiently great to cause the PFC to operate continuously over the entire cycle of AC input voltage from the source 110 as shown in FIGS. 3A and 3B. For example, a current graph 400 in FIG. 3A represents the DC load current $I_{LOAD}$ through the load by a substantially horizontal line having a generally constant magnitude at or near a maximum load current $I_{LOAD\_MAX}$. A sinusoidal curve 410 in FIG. 3B represents the corresponding line current $I_{AC\_SOURCE}$ drawn from the AC source by the full-wave bridge rectifier 112 for the high load current. As shown in FIG. 3B, the sinusoidal curve varies continuously a positive peak current $+I_{AC\_PEAK}$ to a negative peak current $-I_{AC\_PEAK}$.

Figure 4A:
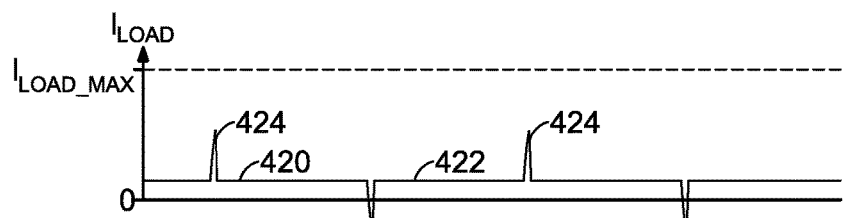
FIG. 4A illustrates a graph of an output load current $I_{LOAD}$ produced by the DC-DC converter of FIG. 1 having a lower magnitude than the load current of FIG. 3A, the graph of the output load current showing pulses caused by non-continuous operation of the power factor controller of FIGS. 1 and 2.

In contrast to the constant current load current 400 FIG. 3A, a current curve 420 in FIG. 4A represents a load current $I_{LOAD}$ that is not constant with respect to time. Rather, an overall current magnitude 422 is well below the maximum load current $I_{LOAD}$. Furthermore, the load current includes a plurality of pulses 424 extending above the overall current magnitude and a plurality of pulses 426 extending below the overall current magnitude. The pulses cause perceptible flickering of the light emitted by the LED load 340.

Figure 4B:
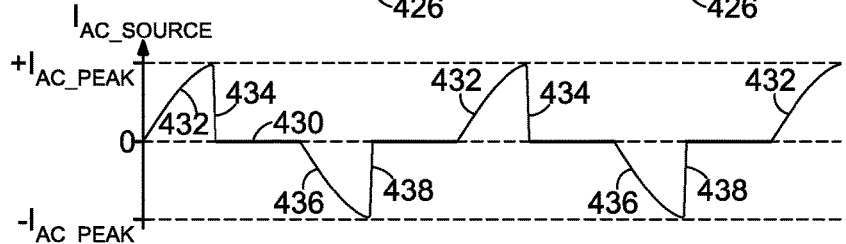
FIG. 4B illustrates a graph of the non-continuous current drawn from the AC source at the low load current of FIG. 4A.

The pulses 424, 426 in the load current 420 of FIG. 4A may be explained by the line current $I_{AC\_SOURCE}$ drawn by the PFC 120 as represented by a curve 430 in FIG. 4B. Unlike the line current curve 410 in FIG. 3B, the line current curve in FIG. 4B is not a continuous sinusoidal curve. Rather, because of the much lower load current $I_{LOAD}$ drawn by the LED load 340, the PFC only needs to draw current from the AC source 110 during a portion of each AC half-cycle. Thus, the line current magnitude has a smoothly increasing positive portion 432 during a first portion of each positive half-cycle followed by a rapidly decreasing portion 434 to zero magnitude. Similarly, the line current magnitude has a smoothly increasing negative portion 436 during a first portion of each negative half-cycle followed by a rapid decreasing portion 438 to zero magnitude. The rapid decreases to zero magnitude have a large di/dt (change in current with respect to time) that causes noise in the circuitry. The circuit noise affects the operation of the drive IC 240, which causes the unwanted pulses 424, 426 in the load current shown in the upper graph of FIG. 4A.

Figure 5:
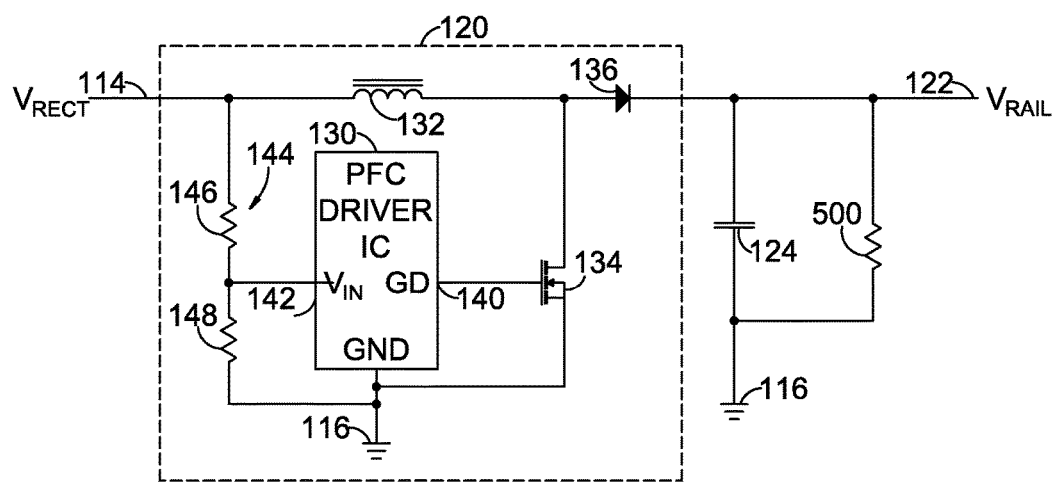
FIG. 5 illustrates the power factor controller of FIG. 2 with a simple dummy load connected to the output of the power factor controller to force the power factor controller to operate continuously throughout the entire sinusoidal cycle.

FIG. 5 illustrates a first solution for stabilizing the PFC operation with the DC load is reduced. In FIG. 5, the PFC 120 is illustrated as shown in FIG. 2. The filter capacitor 124 is connected between the second voltage ($V_{RAIL}$) bus 122 and the primary side circuit ground reference 116 as previously described. In FIG. 5, dummy load resistor 500 is connected between the second voltage bus and the primary side circuit ground reference. For example, in one embodiment, the dummy load resistor may have a resistance of approximately 200,000 ohms, which dissipates about 1 watt of power when the magnitude of the second voltage $V_{RAIL}$ from the PFC is about 450 volts. The dummy load resistor draws a sufficient magnitude of current from the second voltage bus to cause the PFC to operate continuously even when the load current $I_{LOAD}$ through the LED load 340 is low such as illustrated in FIG. 4.

The dummy load resistor 500 provides a solution to the intermittent operation of the PFC 120 and thus eliminates the noise pulses shown in FIG. 4; however, the dummy load resistor dissipates power at all times irrespective of the load current $I_{LOAD}$ being high or low. Thus, power is wasted at all times, even when the benefit of the dummy load resistor is not needed at moderate to high magnitudes of load current. System efficiency is important, particularly at high magnitudes of load current; however, the power dissipated by the dummy load resistor substantially reduces system efficiency.

Figure 6:
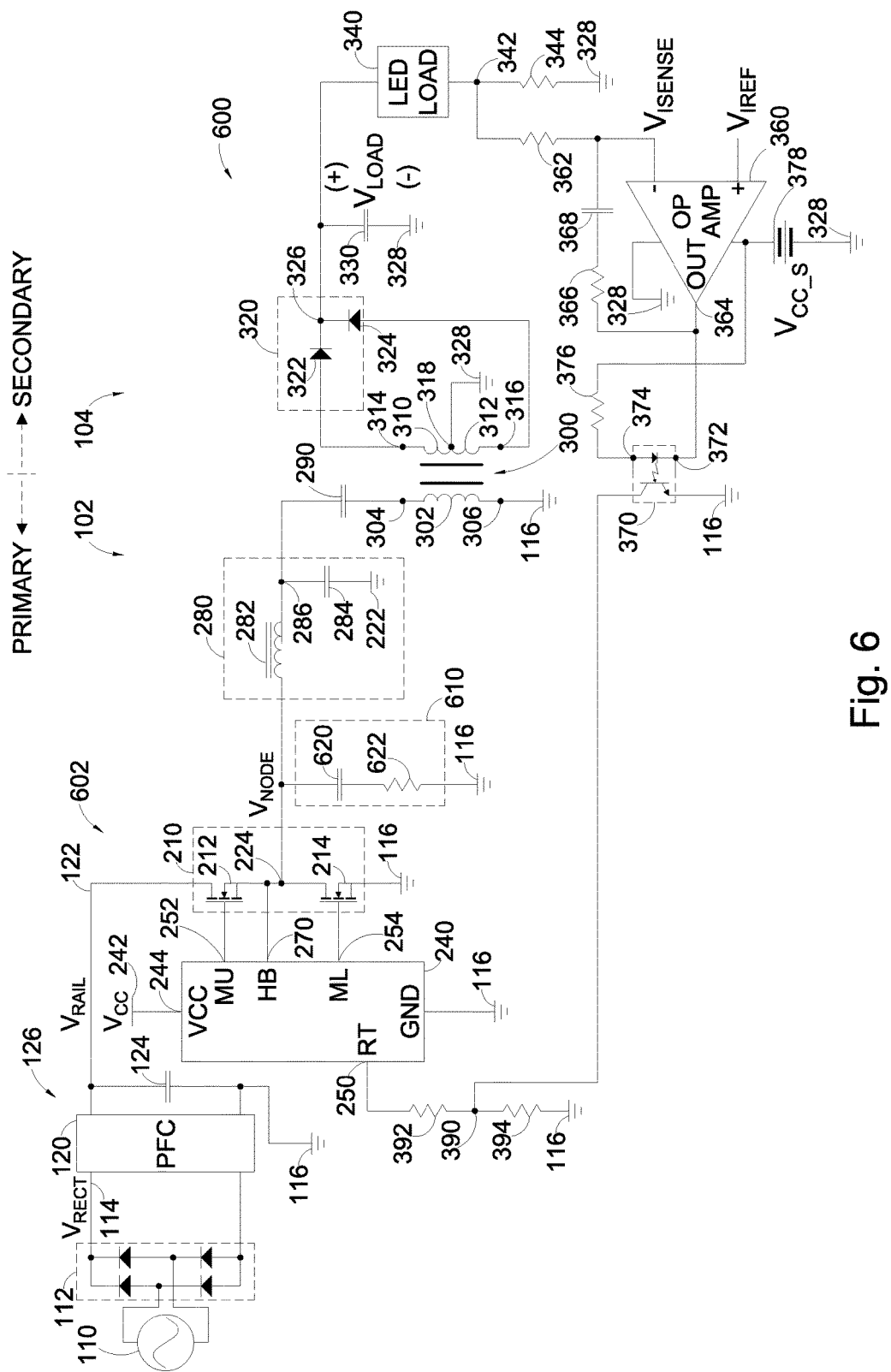
FIG. 6 illustrates the LED driver of FIG. 1 wherein the DC-to-DC converter is modified to include a frequency dependent dummy load connected to the output of the half-bridge switching circuit.

FIG. 6 illustrates an LED driver 600 corresponding to the LED driver 100 of FIG. 1, wherein the LED driver of FIG. 6 comprises a modified DC-to-DC converter (second stage) 602. The DC-to-DC converter of FIG. 6 includes a frequency-dependent dummy load circuit 610 connected to the common switched node 224 of the half-bridge switching circuit 210. The frequency dependent dummy load circuit comprises a dummy load capacitor 620 connected in series with a dummy load resistor 622 between the common switched node and the primary side circuit ground reference 116. In one illustrated embodiment, the dummy load capacitor has a capacitance of approximately 100 picofarads, and the dummy load resistor has a resistance of approximately 1,500 ohms. Unlike the dummy load resistor 500 of FIG. 5, which dissipates power under all load current conditions, the dummy load of FIG. 6 dissipates less power at lower frequencies corresponding to greater load currents and dissipates more power at higher frequencies at corresponding to lower load currents.

Figure 7:
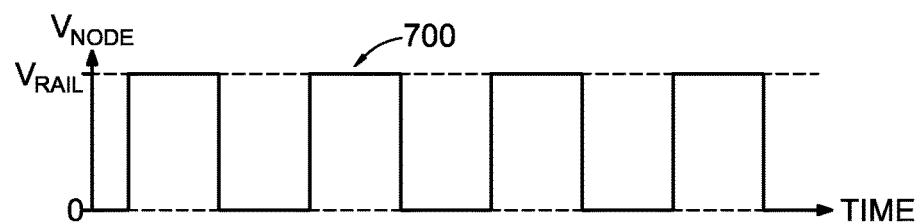
FIG. 7 illustrates a graph of the voltage on the output of the half-bridge switching circuit applied to the input of the frequency dependent dummy load of FIG. 6.
Figure 8:
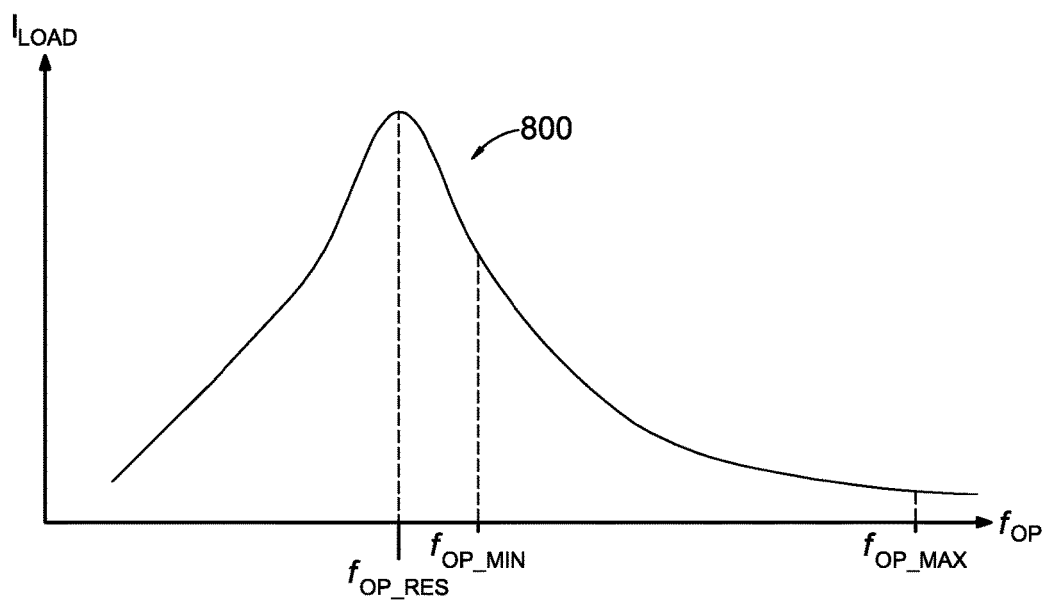
FIG. 8 illustrates a graph of the load current $I_{LOAD}$ versus the operating frequency $f_{OP}$ of the half-bridge switching circuit.

The different power dissipations of the frequency-dependent dummy load circuit 610 under different output load current conditions can be understood in view of FIGS. 7 and 8.

FIG. 7 illustrates a voltage waveform $V_{NODE}$ 700 at the common switched node 224 of the half-bridge switching circuit 210, which is connected to the dummy load circuit

610. As illustrated, the voltage waveform is a square wave, which has a positive voltage magnitude of approximately $V_{RAIL}$ when the first switch 212 is turned on and which has a substantially 0 voltage (e.g., at or near the voltage of the primary side circuit ground reference 116) when the second switch 214 is turned on. The voltage waveform operates at a frequency determined by the drive IC 240 in response to the feedback from the operational amplifier 360 via the photocoupler 370. As discussed above, a higher frequency causes less load current through the LED load 340 to be provided. A lower frequency causes more load current to be provided.

The RMS value of the AC component of the switched voltage $V_{NODE}$ is defined as:

$$V_{NODE\_RMS} = \frac{V_{RAIL} \times \sqrt{2}}{\pi} \qquad (1)$$

Within the frequency-dependent dummy load circuit 610, the dummy load capacitor 620 blocks all of the DC current such that only the AC component of the switched voltage produces current that passes through the dummy load. The active power ($P_{RDL}$) dissipated by the dummy load resistor 622 is defined as:

$$P_{RDL} = \left| \frac{V_{NODE\_RMS}}{R_{622} + \frac{1}{j\omega C_{620}}} \right|^2 \times R_{622} \qquad (2)$$

In Equation (2) $C_{620}$ is the capacitance of the dummy load capacitor 620, $R_{622}$ is the resistance of the dummy load resistor 622, and w is the radian frequency (e.g., $\omega = 2\pi f_{OP}$). The frequency $f_{OP}$ is the operating frequency of the drive IC 240 at the load current $I_{LOAD}$ being generated.

In the illustrated embodiment, the impedance (resistance) of the dummy load resistor 622 is selected to be much less than the impedance of the dummy load capacitor at the frequencies of interest:

$$R_{622} \ll \left| \frac{1}{j\omega C_{620}} \right| \qquad (3)$$

Accordingly, Equation (2) can be simplified to:

$$P_{RDL} = V_{NODE\_RMS}^2 \times (\omega C_{620})^2 \times R_{622} = V_{NODE\_RMS}^2 \times (C_{620})^2 \times (2\pi f_{OP})^2 \times R_{622} \qquad (4)$$

As shown in Equation (4), the power dissipated in the dummy load resistor 622 is proportional to the operating frequency squared (e.g., $P_{RDL} \propto (f_{OP}^2)$).

FIG. 8 illustrates a graph 800 of the relationship between the operating frequency $f_{OP}$ and the LED load current $I_{LOAD}$. The operating frequency varies between a minimum operating frequency ($f_{OP\_MIN}$) and a maximum operating frequency ($f_{OP\_MAX}$). The minimum operating frequency is greater than the resonant frequency ($f_{OP\_RES}$) of the resonant circuit 280. The operating frequency of the drive IC 240 increases as the load current decreases, and the operating frequency decreases as the load current increases. Since the power dissipated in the dummy load resistor 622 is proportional to the square of the operating frequency, the power dissipated in in the dummy load resistor decreases and the dummy load current through the dummy load resistor decreases as the operating frequency decreases with increased load current. Conversely, the power dissipated in in the dummy load resistor increases and the dummy load current through the dummy load resistor increases as the operating frequency decreases with increased load current. Thus, the frequency-dependent dummy load provides additional current when needed to maintain the PFC 120 in the continuous operation mode. For example, in one embodiment, the DC-to-DC converter (second stage) 602 of the LED driver 600 of FIG. 6 is configured to operate at a minimum operating frequency ($f_{OP\_MIN}$) of 40 kHz at a maximum load current and to operate at a maximum operating frequency ($f_{OP\_MAX}$) of 160 kHz at a minimum load current. The dummy load resistor has a resistance value chosen to dissipate approximately 1 watt at 160 kHz when the minimum load current is being generated. When the operating frequency is reduced to 40 kHz when the maximum load current is being generated, the dummy load resistor dissipates approximately (¼)² watt (e.g., approximately 0.0625 watt). Thus, the frequency-dependent dummy load 610 accomplishes the desired goal of providing a dummy load that dissipates sufficient power at high operating frequencies to maintain the continuous operation of the PFC 120 at low load currents and that dissipates significantly less power (e.g., just over 6 percent of the maximum dissipation) at low operating frequencies and high load currents.

Although the frequency-dependent dummy load 610 works well to improve the operation of the PFC 120 and to eliminate the noise in the load current, the dummy load dissipates some power at frequencies and load currents where the PFC 120 operates continuously without the dummy load. For example, at a mid-range of load currents produced at a mid-range of operating frequencies (e.g., around approximately 80 kHz), the dummy load resistor 622 in the illustrated example dissipates approximately ¼ watt (e.g., (½)²). Although the dissipation is acceptable, a further reduction in the power dissipated in the dummy load resistor is desirable.

Figure 9:
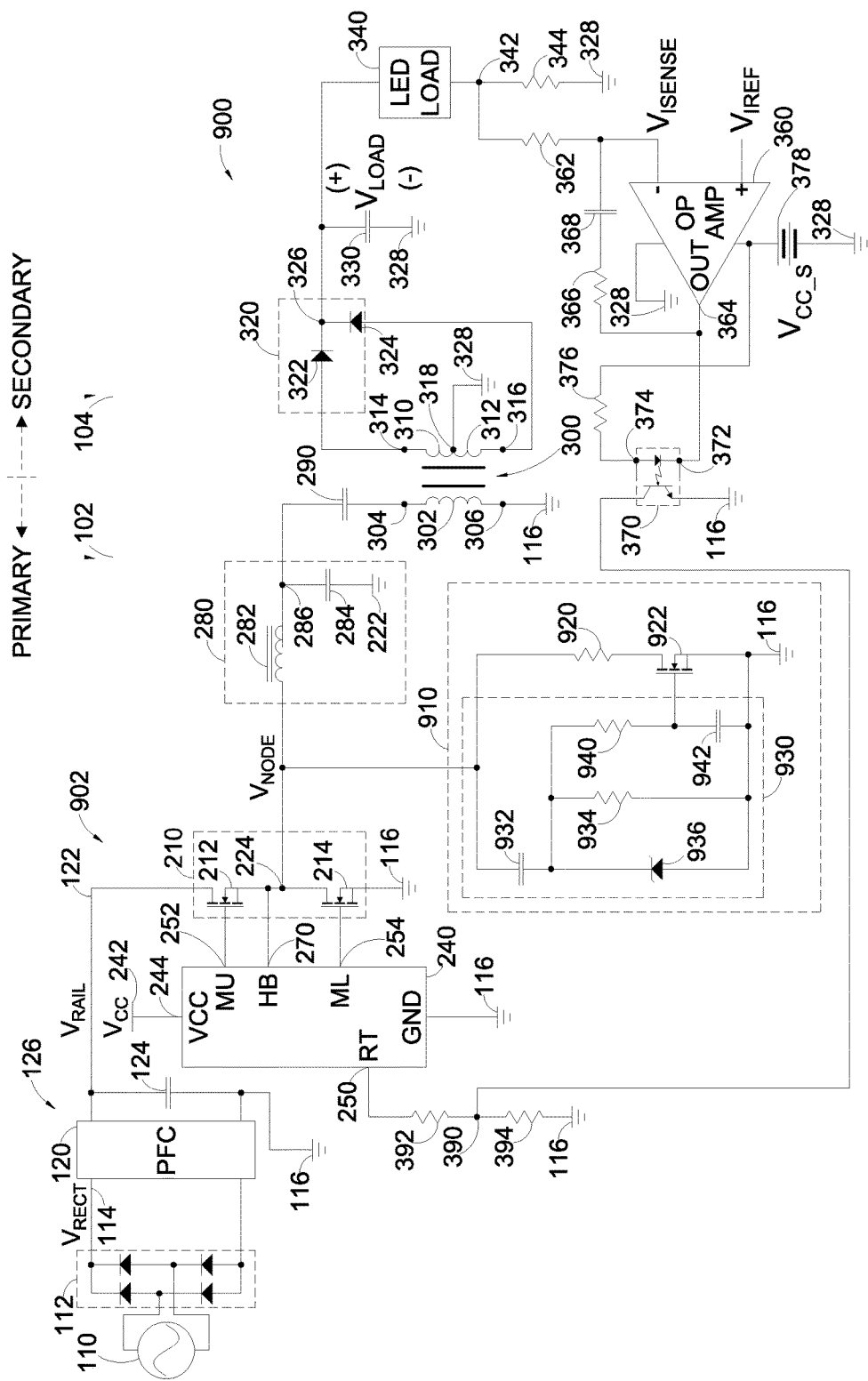
FIG. 9 illustrates a further modified version of the LED driver of FIG. 6, wherein the DC-to-DC converter includes a dummy load having a switchable dummy load resistor that can be disabled at lower switching frequencies corresponding to higher load currents.

FIG. 9 illustrates a further improved LED driver circuit 900 having a further modified DC-to-DC converter (second stage) 902. In the DC-to-DC converter of FIG. 9, the frequency-dependent dummy load circuit 610 of FIG. 6 is replaced with a frequency-controlled dummy load circuit 910. The frequency-controlled dummy load circuit comprises a dummy load resistor 920 having a first terminal connected to the common switched node 224 of the half-bridge switching circuit 210. A second terminal of the dummy load resistor is connected to the drain terminal of a dummy load control MOSFET 922, which may be an n-channel MOSFET similar to the previously described MOSFETs 212, 214. The source terminal of the MOSFET is connected to the primary side circuit ground reference 116. As described below, the MOSFET is selectively enabled to conduct to electrically connect the dummy load resistor from the common switched node to the ground reference to draw additional current from the common switched node.

The gate terminal of the dummy load control MOSFET 922 is connected to a gate control circuit 930 within the frequency-controlled dummy load circuit 910. The gate control circuit comprises an AC-coupling capacitor 932, which has a first terminal connected to the common switched node 224 and which has a second terminal connected to a first terminal of a first control resistor 934. A second terminal of the first control resistor is connected to the primary side circuit ground reference 116. A Zener diode 936 is connected across the first control resistor with the cathode of the Zener diode connected to the first terminal of the first control resistor and with the anode of the Zener diode connected to the second terminal of the first control resistor and to the primary side circuit ground reference. A first terminal of a second control resistor 940 is connected to the first terminal of the first control resistor. A second terminal of the second control resistor is connected to the gate terminal of the dummy load control MOSFET. The second terminal of the second control resistor and the gate terminal of the dummy load control MOSFET are connected to the first terminal of a dummy load control filter capacitor 942. A second terminal of the dummy load control filter capacitor is connected to the primary side circuit ground reference 116.

The AC-coupling capacitor 932 couples the voltage $V_{NODE}$ to the cathode of the Zener diode 936 and to the first terminal of the first control resistor 934. The Zener diode rectifies the voltage such that a positive DC voltage is produced on the first terminal of the first control resistor as referenced to the primary side circuit ground reference 116. The Zener diode also limits the magnitude of the positive DC voltage. The voltage on the first terminal of the first control resistor is coupled to the dummy load control filter capacitor 942 via the second control resistor 940. The second control resistor and the filter capacitor operate as a low-pass filter to prevent rapid changes to the voltage on the gate terminal of the dummy load control MOSFET 922. When the voltage across the dummy load control filter capacitor reaches the turn-on threshold of the gate-to-source voltage of the dummy load control MOSFET, the MOSFET turns on and electrically connects the dummy load resistor 920 between the 224 and the primary side circuit ground reference. As described below the voltage across the dummy load control filter capacitor is sufficient to turn on the MOSFET when the switching frequency $f_{OP}$ corresponds to a load current $I_{LOAD}$ that may be too low to maintain the PFC 120 in the continuous operation mode.

The control of the MOSFET 922 can be understood by first determining the relationship between the voltage $V_{R934}$ across the first control resistor 934 and the operating frequency $f_{OP}$. The voltage across the first control resistor can be determined as follows:

$$V_{R934} = \left| \frac{V_{NODE\_RMS}}{R_{934} + \frac{1}{j\omega C_{932}}} \right| \times R_{934} \quad (5)$$

At the switching frequencies of interest, the impedance (resistance) $R_{934}$ of the first control resistor is selected to be much less than the impedance of the AC-coupling capacitor 932 (having a capacitance $C_{932}$) as follows:

$$R_{934} \ll \left| \frac{1}{j\omega C_{932}} \right| \quad (6)$$

Equation (5) simplifies to the following:

$$V_{R934} = |V_{NODE\_RMS} \times R_{934} \times j \times 2\pi f_{OP} \times C_{932}| \quad (7)$$

The peak voltage $V_{R934\_PEAK}$ across the first control resistor 934 can be expressed as:

$$V_{R934\_PEAK} = 2 \times \sqrt{2} \times |V_{NODE\_RMS} \times R_{934} \times j \times 2\pi f_{OP} \times C_{932}| \quad (8)$$

As shown in Equation (8), the peak voltage $V_{R934\_PEAK}$ across the first control resistor 934 is proportional to the operating frequency $f_{OP}$. This proportional relationship is used to control the switching of the dummy load control MOSFET 922 to selectively enable the dummy load resistor 920 by first picking an operating frequency $f_{OP\_DUMMY\_ON}$ at which the dummy load resistor is to be enabled. The operating frequency $f_{OP\_DUMMY\_ON}$ is selected to be below the operating frequency corresponding to an insufficient load current $I_{LOAD}$ where the PFC 120 starts operating intermittently. Using Equation (8), the resistance $R_{934}$ of the first control resistor 934 and the capacitance $C_{932}$ of the AC-coupling capacitor 932 are selected to generate the peak voltage $V_{R934\_PEAK}$ that produces a resulting DC voltage $V_{R934\_DC}$ with a sufficient magnitude to exceed the turn-on threshold voltage $V_{GS\_TH}$ of the dummy load control MOSFET when applied to the gate terminal of the MOSFET via the second control resistor 940. The foregoing can be expressed as:

$$V_{R934\_DC} = 2/\pi = V_{R934\_PEAK} = 2/\pi \times 2 \times \sqrt{2} \times |V_{NODE\_RMS} \times R_{934} \times j \times 2\pi f_{OP\_DUMMY\_ON} \times C_{932}| = V_{GS\_TH} \quad (9)$$

When the capacitance of the AC-coupling capacitor 932 and the resistance of the first control resistor 934 are selected in accordance with the foregoing, the dummy load resistor 920 is connected into the circuit (e.g., the MOSFET 922 is turned on) when the operating frequency $f_{OP}$ is greater than or equal to the selected frequency $f_{OP\_DUMMY\_ON}$ (e.g., $f_{OP} \geq f_{OP\_DUMMY\_ON}$). The dummy load will be disconnected from the circuit (e.g., the MOSFET is turned off) when the operating frequency $f_{OP}$ is less than the selected frequency $f_{OP\_DUMMY\_ON}$ (e.g., $f_{OP} < f_{OP\_DUMMY\_ON}$). By setting the selected frequency $f_{OP\_DUMMY\_ON}$ just below the frequency where the load current becomes insufficient to cause the PFC 120 to operate continuously, the frequency-controlled dummy load circuit 910 allows the DC-to-DC convert circuit 900 to operate efficiently at higher load currents while preventing intermittent operation of the PFC at lower load currents. Thus the frequency-controlled dummy load circuit minimizes the power dissipation in the dummy load resistor such that power is dissipated only when necessary to assure the proper operation of the PFC. Although the MOSFET may transition from fully off to fully on over a small range of frequencies around the threshold frequency, the MOSFET will be fully on at higher frequencies where additional current through the dummy load resistor is needed to maintain the PFC in the continuous operation mode. Although the MOSFET may have a small on-resistance, the on-resistance of the MOSFET is sufficiently small relative to the resistance of the dummy load resistor to be ignored. Similarly, the MOSFET may have a small leakage current when off; however, the leakage current is insignificant such that any power dissipated by the dummy load resistor when the MOSFET is turned off can be ignored. Thus, the path through the dummy load resistor and the MOSFET can be considered to be an open circuit when the MOSFET is turned off at the lower range of switching frequencies.

Figure 10A:
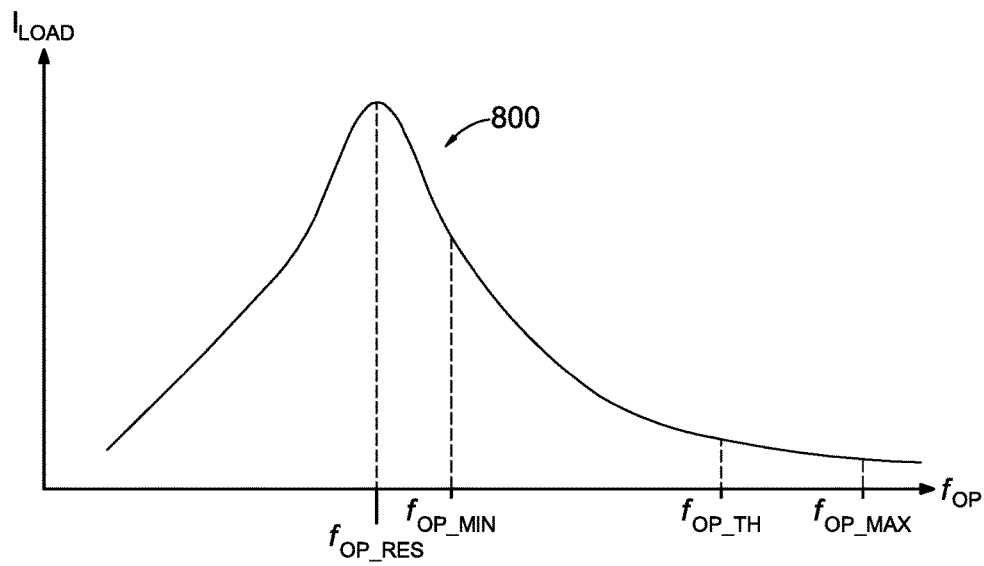
FIG. 10A illustrates a graph of the load current $I_{LOAD}$ versus the operating frequency $f_{OP}$ of the half-bridge switching circuit, the graph corresponding to the graph of FIG. 8.
Figure 10B:
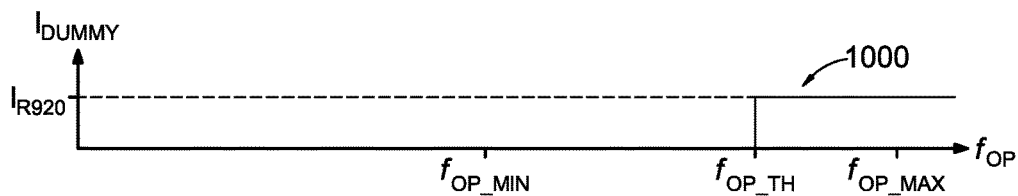
FIG. 10B illustrates a graph of the dummy load current $I_{DUMMY}$ produced by the dummy load resistor of FIG. 9 showing the transition from zero dummy load current to full dummy load current at the threshold operating frequency $f_{OP\_TH}$.
Figure 10C:
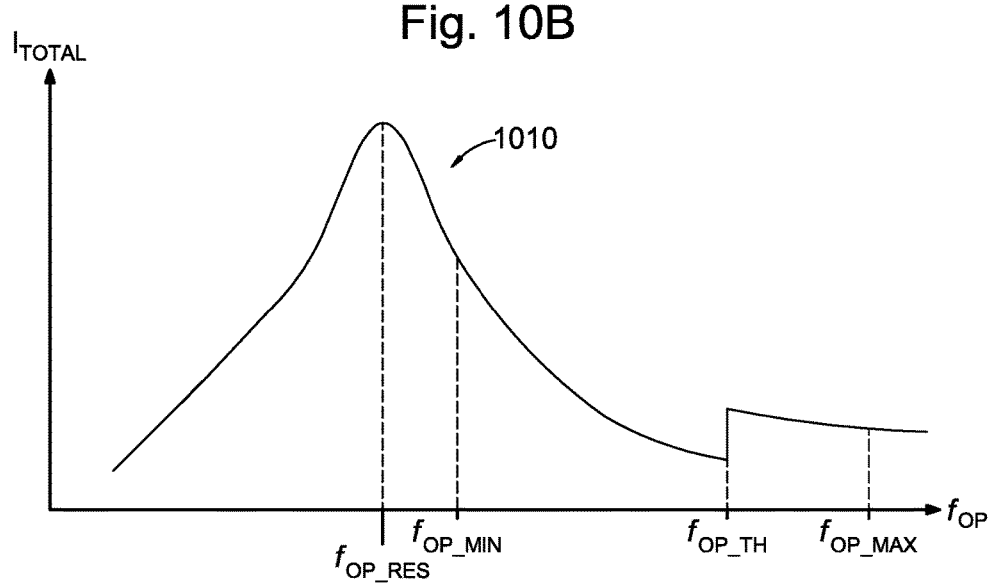
FIG. 10C illustrates a graph of the total current $I_{TOTAL}$ drawn from the AC source by power factor controller of FIG. 9 by adding the actual load current $I_{LOAD}$ to the dummy load current $I_{DUMMY}$, the graph showing the transition in the total load current at the threshold operating frequency $f_{OP\_TH}$.

The operation of the frequency-dependent load impedance 910 of FIG. 9 is illustrated in FIGS. 10A, 10B and 10C. FIG. 10A corresponds to FIG. 8 and illustrates the graph 800 of the load current $I_{LOAD}$ versus the operating frequency $f_{OP}$ of the half-bridge switching circuit. FIG. 10B illustrates a graph 1000 of a dummy load current $I_{DUMMY}$ that passes through the dummy load resistor 920 of FIG. 9. The graph of the dummy load current shows a transition at a threshold operating frequency $f_{OP\_TH}$, which corresponds to the selected frequency $f_{OP\_DUMMY\_ON}$ at which the MOSFET 922 turns on. The dummy load current transitions from a substantially zero magnitude to a dummy load current $I_{R920}$, which is the magnitude of the current flowing through the dummy load resistor when the MOSFET is turned on. FIG. 10C illustrates a graph 1010 of the total current $I_{TOTAL}$ drawn from the AC source by power factor controller 120 of FIG. 9 by adding the actual load current $I_{LOAD}$ of FIG. 10A to the dummy load current $I_{DUMMY}$ of FIG. 10B. The total load current graph of FIG. 10C shows the transition in the total load current at the threshold operating frequency $f_{OP\_TH}$.

As illustrated herein, the frequency-dependent dummy load 910 of FIG. 9 provides improved control of the operation of the PFC 120 over a range of higher frequencies where the PFC would otherwise operate in the discontinuous mode illustrated in FIG. 4B.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A system for controlling the current through a DC load, the system comprising:
   a first rectifier circuit configured to receive an AC voltage, the rectifier generating a rectified voltage on rectifier output;
   a power factor controller coupled to the rectifier output, the power factor controller generating a conditioned DC voltage on a power factor controller output; and
   a DC-to-DC converter coupled to the power factor controller output to receive the conditioned DC voltage and to generate a load current, the DC-to-DC converter including:
      a DC-to-AC inverter configured to generate a switched AC voltage at an operating frequency, the operating frequency having a frequency range between a minimum frequency and a maximum frequency, the DC-to-AC inverter configured to vary the operating frequency in response to a feedback signal;
      an isolation transformer having a primary winding and a secondary winding, the primary winding coupled to the output of the DC-to-AC inverter to receive the switched AC voltage and to produce a secondary AC voltage on the secondary winding;
      a second rectifier circuit connected to the secondary winding of the isolation transformer to receive the secondary AC voltage, the second rectifier circuit configured to rectify the secondary AC voltage to provide a DC voltage to a load to cause a load current to flow through the load;
      a current sensor that generates a feedback signal responsive to the magnitude of the load current and the magnitude of a reference current, the DC-to-AC inverter responsive to the feedback signal to increase the operating frequency when the magnitude of the load current is greater than the magnitude of the reference current and to decrease the operating frequency when the magnitude of the load current is less than the magnitude of the reference current; and
      a frequency-dependent load impedance coupled to the output of the DC-to-AC inverter, the frequency-dependent load impedance configured to have a first impedance when the DC-to-AC inverter is operating at the minimum operating frequency, the frequency-dependent load impedance having a second impedance when the DC-to-AC inverter is operating at the maximum operating frequency.

2. The system as defined in claim 1, wherein the first impedance is greater than the second impedance such that the frequency-dependent load impedance draws more current from the DC-to-AC inverter at the maximum operating frequency and draws less current from the DC-to-AC inverter at the minimum operating frequency.

3. The system as defined in claim 1, wherein the frequency-dependent load impedance comprises a series resistance-capacitance circuit connected between the output of the DC-to-AC inverter and a reference voltage, the series resistance-capacitance circuit having a variable impedance that varies from the first impedance at the minimum operating frequency to the second impedance at the maximum operating frequency.

4. The system as defined in claim 1, wherein:
   the frequency-dependent load impedance comprises a load resistor in series with a semiconductor switch, the load resistor and the semiconductor switch connected between the output of the DC-to-AC inverter and a reference voltage, the semiconductor switch having a control terminal; and
   a switch controller connected to the control terminal of the semiconductor switch, the switch controller responsive to the operating frequency of the switched AC voltage to turn off the semiconductor switch when the operating frequency is below a threshold frequency and to turn on the semiconductor switch when the operating frequency is at or above the threshold frequency, the load resistor drawing current from the DC-to-AC inverter only when the semiconductor switch is turned on.

5. A method for maintaining a power factor controller in a continuous operation mode in an LED driver circuit wherein the power factor controller receives a rectified voltage from a first rectifier and generates a conditioned DC voltage to a DC-to-DC converter, the DC-to-DC converter including a DC-to-AC inverter operating at a variable switching frequency to provide an AC voltage on an inverter output, the inverter output AC-coupled to a second rectifier, the second rectifier generating a load current, the variable switching frequency varying from a minimum switching frequency at a maximum load current to a maximum switching frequency at a minimum load current, the power factor controller operating in a discontinuous operation mode at the minimum load current, the method comprising:
   coupling a frequency-dependent load impedance to the inverter output; and
   varying the frequency-dependent load impedance from a first load impedance at the minimum switching frequency of the inverter to a second load impedance at the maximum switching frequency, the first load impedance greater than the second load impedance, the second load impedance sufficiently small to cause an additional current to flow from the inverter output, the additional current sufficient to cause the power factor controller to operate in the continuous operation mode when the DC-to-AC inverter is operating at the maximum switching frequency.

6. The method as defined in claim 5, wherein the frequency-dependent load impedance varies continuously from the first load impedance to the second load impedance as the switching frequency varies from the minimum switching frequency to the maximum switching frequency.

7. The method as defined in claim 5, wherein the first load impedance is maintained over a first range of switching frequencies from the minimum switching frequency to a frequency less than a threshold switching frequency, and the second load impedance is maintained over a second range of switching frequencies from the threshold switching frequency to the maximum switching frequency.

8. The method as defined in claim 7, wherein the first load impedance is effectively an open circuit.

9. The method of claim 8, wherein the second load impedance is effectively the impedance of a resistor selectively connected to the inverter output by turning on a semiconductor switch.

10. A system for controlling the current through a DC load, the system comprising:
- a power factor controller that provides a DC voltage to a first voltage rail, the first voltage rail referenced to a second voltage rail;
- a DC-to-AC inverter coupled between the first voltage rail and the second voltage rail, the DC-to-AC inverter having an inverter output, the DC-to-AC inverter switching the inverter output between the first voltage rail and the second voltage rail at a variable operating frequency;
- an isolation transformer having a primary winding AC-coupled to the inverter output and having a secondary winding connected to an AC-to-DC rectifier, the AC-to-DC rectifier providing a secondary current to a DC load, the DC load current responsive to the operating frequency of the DC-to-AC inverter; and
- a frequency-dependent load impedance coupled to the inverter output, the frequency-dependent load impedance configured to have a first impedance when the variable operating frequency is at a minimum operating frequency, the frequency-dependent load impedance configured to have a second impedance when operating frequency is at a maximum operating frequency.

11. The system as defined in claim 10, wherein the frequency-dependent load impedance comprises a series resistance-capacitance circuit connected between the output of the DC-to-AC inverter and a reference voltage, the series resistance-capacitance circuit having a variable impedance that varies from the first impedance at the minimum operating frequency to the second impedance at the maximum operating frequency.

12. The system as defined in claim 2, wherein the first impedance is greater than the second impedance such that the frequency-dependent load impedance draws more current from the DC-to-AC inverter at the maximum operating frequency and draws less current from the DC-to-AC inverter at the minimum operating frequency.

13. The system as defined in claim 10, wherein:
- the frequency-dependent load impedance comprises a load resistor in series with a semiconductor switch, the resistor and the semiconductor switch connected between the output of the DC-to-AC inverter and a reference voltage, the semiconductor switch having a control terminal; and
- a switch controller connected to the control terminal of the semiconductor switch, the switch controller responsive to the operating frequency of the switched AC voltage to turn off the semiconductor switch when the operating frequency is below a threshold frequency and to turn on the semiconductor switch when the operating frequency is at or above the threshold frequency, the load resistor drawing current from the DC-to-AC inverter only when the semiconductor switch is turned on.

* * * * *